UNITED STATES PATENT OFFICE.

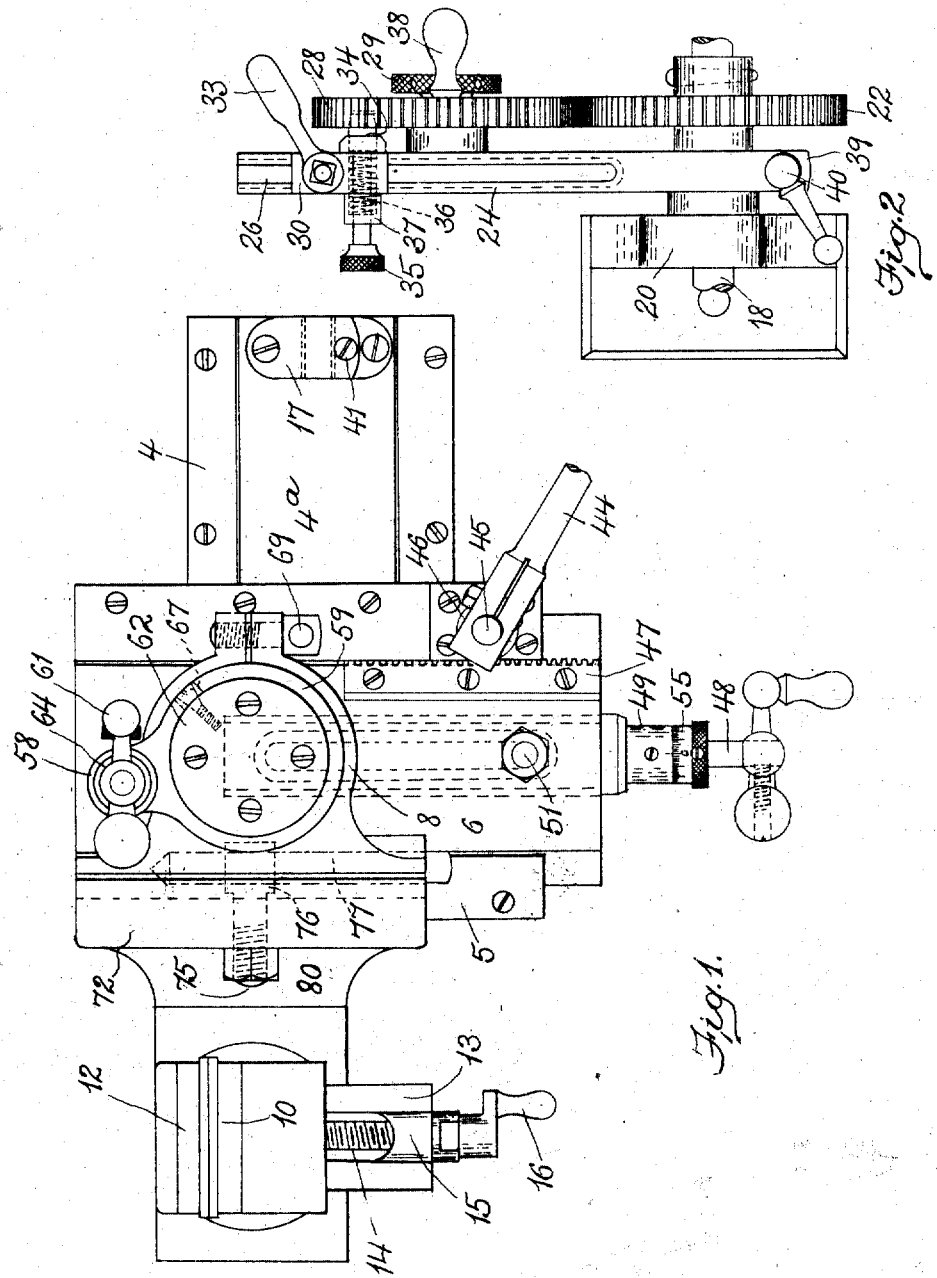

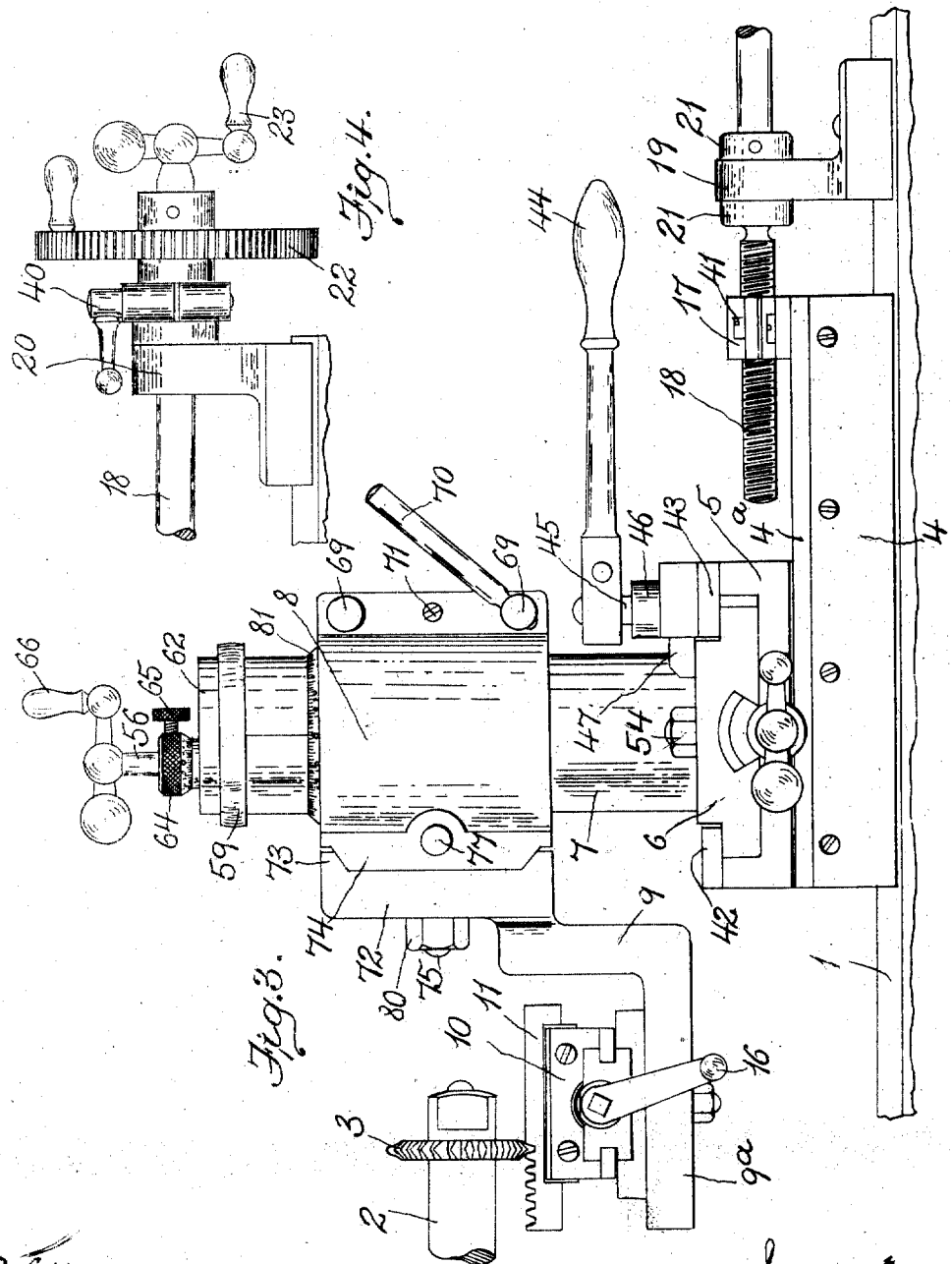

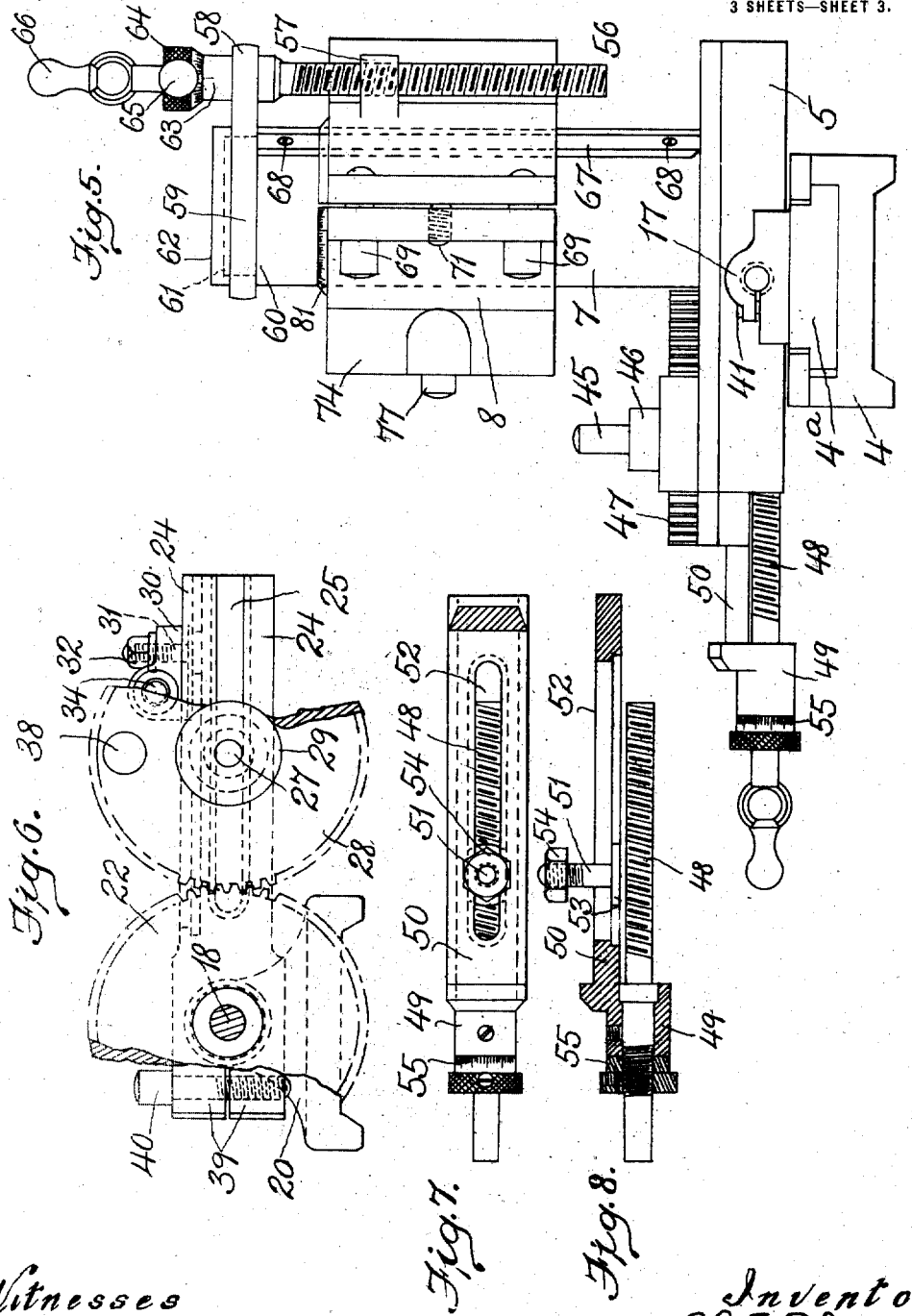

HENRICK J. HJORTH, OF WOBURN, MASSACHUSETTS.

UNIVERSAL LATHE ATTACHMENT.

1,232,801.  Specification of Letters Patent.  Patented July 10, 1917.

Application filed September 6, 1913. Serial No. 788,481.

*To all whom it may concern:*

Be it known that I, HENRICK J. HJORTH, a citizen of the United States, and resident of Woburn, in the county of Middlesex and State of Massachusetts, have invented certain new and useful Improvements in Universal Lathe Attachments, of which the following is a specification.

The present invention relates to an attachment for lathes, being designed particularly for lathes of the type known as bench lathes. The attachment is more particularly designed to hold work in position to be acted upon by a milling cutter and is provided with adjustments whereby all kinds of milling operations may be performed on the work so held. The essential principles of the invention, however, are not limited to an apparatus for holding work simply to be operated upon by a milling cutter, but are capable of embodiment in constructions designed for other uses. Accordingly, in its broader aspects my invention relates to what may be called a universal lathe attachment adapted to be mounted on a lathe for enabling all characters of special work to be performed on the lathe with as great accuracy as such work can be carried out on the machines built especially to do such work and nothing else. Therefore, although the invention as illustrated is designed particularly as a milling attachment, I wish it to be understood that the principles of the invention are not thus limited.

In the accompanying drawings, wherein I have shown the preferred embodiment of my invention, Figure 1 is a plan view of the attachment.

Fig. 2 is a plan view of the longitudinal feeding and indexing mechanism used in connection with the attachment.

Fig. 3 is a front elevation of the attachment shown in position on the lathe.

Fig. 4 is a front elevation of the feed mechanism shown in Fig. 2.

Fig. 5 is a right hand end elevation of the attachment.

Fig. 6 is a similar elevation partly broken away of the mechanism shown in Figs. 2 and 4.

Figs. 7 and 8 are respectively a plan view and a longitudinal section of the cross feed mechanism which forms a part of the attachment.

Like reference characters designate the same parts in all the figures.

This attachment is adapted to be mounted on the ways of a lathe and to be moved along such ways toward and from the head stock, the ordinary foot stock of the lathe having first been removed. I have not illustrated the lathe itself because this invention relates particularly to the attachment; and the construction of the attachment and the mode in which it is used may be sufficiently well understood without any particular description of the lathe itself. All of the lathe that is shown appears in Fig. 3, where the ways are indicated at 1 and the head stock spindle at 2, with a milling cutter 3 secured upon it. It may be said that the lathe may be of any desired character, either a standard or a special lathe, and that the head stock and the means for driving the head stock spindle 2 may be of any ordinary or special construction.

The attachment proper comprises a base 4 which is adapted to rest upon the bed of the lathe fitting the ways thereof and contains a longitudinal slide $4^a$. Mounted on such longitudinal slide is a transverse guideway 5 in which is slidingly contained a cross feed slide 6, from which rises a post or upright 7. The post is surrounded by a sleeve 8, which is adjustable both longitudinally upon and angularly about the post, and to which there is secured a bracket 9 carrying a clamp 10, by which the work 11 is held. Said sleeve may be considered as primarily the work-holding or carrying member. Such clamp is mounted upon a horizontal arm $9^a$ of the bracket, and consists of a fixed rear jaw 12 and a movable front jaw 10 mounted to slide on the guide 13 and operable by a screw 14, which engages a nut in the movable jaw and is held in a bearing 15, which forms a part of the guide 13. This screw is rotated by a crank 16.

It will be seen that the clamp holds the work piece beneath the milling cutter. Adjustments and driving mechanisms are provided which determine the depth, directions and spacing of the cuts produced in the work by the cutter. The position and spacing of the cuts are determined by the longitudinal feeding and indexing mechanism, which I will now describe.

The slide $4^a$ of the attachment is provided with a nut 17, which contains, and meshes with the threads of, a longitudinal feed screw 18, which is rotatably supported in brackets 19 (Fig. 3) and 20 (Fig. 4). The brackets 19 and 20 are fixed to the bed of the lathe and take the place of the foot stock. That part of the feed screw which passes through and between these brackets is not threaded, but has a plain bearing in the brackets. Collars 21 are fixed on the feed screw shaft on opposite sides of the bracket 19 to prevent endwise movement of the shaft. The outer end of the feed screw shaft beyond the bracket 20 carries a gear wheel 22 and a crank 23. The latter may be rotated to place the slide 4ᵃ at any point within the limits of the screw.

Mounted on the sleeve which projects from the bracket 20 and forms part of the bearing for the screw shaft is an arm 24, shown best in Fig. 6, having a longitudinal undercut groove 25 on its side face, and a similar groove 26 in its top face (see Fig. 2). The groove 25 receives the head of a bearing stud 27, whereon an indexing gear wheel 28 is mounted. Such gear wheel is interchangeable with others, and for this reason the pivot stud is made longitudinally adjustable in the slot 25 so that larger or smaller gears may be mounted thereon and put in mesh with the gear 22. A hand wheel or nut 29 is provided for securing the stud rigidly in the slot. A block 30 is similarly secured adjustably in the slot 26 by means of a bolt 31, having its head contained in the undercut part of the groove and its shank passing through the block and provided with a clamp nut 32, with which is connected a handle 33. The block 30 is the holder for an indexing stop pin 34, which has a handle portion 35 passing through the block and is pressed toward the indexing wheel 28 by a spring 36 contained within a socket 37 in the block through which the pin and its shank pass. The index wheel has one or more sockets in its face next to the arm 24 arranged in circular series, and shaped so that the index pin will fit therein. The block 30 is adjustable in the manner described so that the index pin can be brought exactly into alinement with the holes in the index wheel. This adjustment is evidently necessary when a larger or smaller index wheel is substituted for the one previously in place. The index wheel is fitted with a handle 38 which may be used, if desired, for turning it. The arm 24 is removable and also adjustable about the screw feed shaft, and is clamped in place frictionally, having an opening through which passes the sleeve on which it is mounted, and having a kerf passing from its inner end into this opening, and dividing such end into ears 39, which may be drawn together by a clamp screw 40.

It will be readily understood that by choosing the index wheel 28, having the desired gear ratio to the wheel 22 and having the necessary number of holes or sockets for the index stop pin, the longitudinal screw feed may be manipulated to so index the work that equally spaced cuts at any desired distance apart may be produced in the work piece 11, in order, for example, to produce a rack. The attachment may be clamped so as to be immovable by the longitudinal feed screw by causing the nut 17 to bind on the screw. For this purpose the nut is slotted longitudinally and provided with a clamp screw 41, by which it may be brought to bear tightly against the screw.

The cross feed slide 6 is confined in a trough formed in the transverse guideway 5, and is retained by retaining strips 42 and 43. A rapid and coarse movement may be given to this slide by a lever 44 mounted on a pivot shaft 45, which is journaled in a bearing 46 and carries a pinion, not shown, in mesh with a rack 47 secured to the cross slide. This feed mechanism is used when it is desired to move the cross slide quickly. The accurate micrometric adjustment of the cross feed slide is effected by a feed screw 48 (see Figs. 5, 7 and 8), which is threaded through a nut fast to the guide 5 and not shown in these drawings. This cross feed screw is rotatably contained so that it cannot move endwise in a bearing sleeve 49, forming part of a slide or a traveler 50, which is contained in a guideway in the cross feed slide 6, and is movable longitudinally with relation thereto when permitted. A bolt 51 passes through a slot 52 in such traveler and through a hole in the cross feed slide. The head 53 of the bolt lies under shoulders formed in the underside of the traveler at each side of the slot 52, and a nut 54 is threaded on the exposed end of the bolt. When this nut is set up the traveler 50 is bound tight to the cross feed slide and any movement imparted to the traveler by the feed screw necessarily shifts the slide. The clamping nut 54 is released only when it is desired to make the screw feed inoperative and to use the quick feed afforded by the lever 44. A graduated collar 55 is secured upon the cross feed screw and is adapted to coöperate with an index mark on the bearing sleeve 49 to measure the movements given by the feed screw to the cross feed slide.

A micrometric vertical adjustment is given to the work holder by the vertical screw 56, which engages a nut 57 on the sleeve 8 of the work holding bracket, and is itself rotatably supported in a lug 58 which projects from a ring 59 mounted on the top of the column or post 7. This ring rests on a shoulder 60 near the top of the post and surrounds the reduced upper end 61 shown by dotted lines in Fig. 5. A cap 62 is secured to the top of the post and overlies the ring 59, preventing the ring from being removed, but permitting it to rotate about the post. The bearing proper for the vertical screw 56 is provided by a long sleeve 63 secured in the lug 58. This sleeve has an index mark and the screw carries a collar 64 equipped with a clamping screw 65, and formed with a graduated beveled face close to the index mark. A crank handle 66 is provided for turning this screw. The up and down movements of the sleeve 8 are guided by a key 67, which is a strip laid against the outer surface of the post and secured in position by screws 68.

When it is desired to shift the work holding bracket so that the cuts extend at a different inclination to the length of the work piece, the screws 68 may be removed, thereby releasing the key and allowing the work holding bracket and sleeve to be turned about the post, sliding the key with the sleeve around the post. The feed screw 56 and ring 59 are carried with the sleeve, since the ring is also capable of turning about the post. The sleeve 8 is split and may be clamped upon the post by screws 69, which are operated by a bar wrench 70. These screws pass through flanges on the opposed edges of the sleeve, and an adjustable stop screw 71 is threaded through one of the flanges to abut on the other so as to enable the sleeve to be so set up as to have a close fit about the post without binding.

The bracket 9 for the work holding clamp is adapted to be removed from the sleeve 8 to permit substitution of other sorts of work holders. Such bracket is, therefore, provided with a base plate 72 having guiding flanges 73 which embrace inclined surfaces of a guiding rib or plate 74 which is formed on the sleeve 8. A bolt 75 passes through the base plate 72 into the guide member 74, and is provided with a tapped eye 76 engaged with a screw 77 (see Fig. 1), which is held in a horizontal position within the guide member 74. The outer end of the bolt 75 carries a nut 80, which secures the bracket in place. The bracket being a separate piece from the sleeve and being held by a bolt and a removable nut can readily be removed. It may also be adjusted by the screw 77, which gives an adjustment supplemental to that of the cross feed slide. By substituting other holders for that shown on the bracket 9, many diverse kinds of work may be performed with the use of the attachment having the other parts described.

It will be seen that the attachment provides means for adjusting the work with the utmost accuracy in the three coördinate directions, and that in connection with each feed there is an indexing and measuring means for determining with minute accuracy the extent of feed. There is also provision for angular adjustment of the work holder about the post 7, and this angular adjustment is also measured accurately by means of a graduated ring 81 secured to the sleeve 8 and coöperating with an index mark on the post 7.

What I claim and desire to secure by Letters Patent is:—

1. A lathe attachment comprising supporting means, a slide mounted movably upon said supporting means, complemental members, respectively secured upon said supporting means and said slide for giving the latter a relatively rapid movement, and additional means for giving the slide a finely graduated movement comprising a screw in threaded engagement with said supporting means and appliances for detachably connecting said screw to the slide in a manner such as to prevent longitudinal travel with respect thereto.

2. In a lathe attachment a post, a sleeve surrounding said post and adapted to move both longitudinally and rotatably with respect thereto, a screw for giving the sleeve its longitudinal movement and a key for guiding such movement, said key being detachably secured to the post and being movable about the same with the sleeve when released therefrom.

3. In a mechanism of the character described, the combination of a guide member and a supported member movable both longitudinally and laterally with respect to said guide member, and a key element secured to said guide member for limiting the movement of the supported member to one direction, said key element being wholly outside the surface of the supported member and being detachably secured thereto, whereby said key element is movable transversely with the supported member when its attaching means are disconnected.

4. In an apparatus of the character described, the combination with a slide, a screw arranged parallel to the line of movement of said slide, a support on which said slide is mounted for movement and with which said screw is meshed, a traveler movable in the same direction as the slide in which said screw has a bearing and which is provided with means for preventing endwise movement relatively to the screw, and means for effecting detachable union between the slide and traveler.

5. In an apparatus of the character indicated, the combination of a main slide, an auxiliary slide mounted with provision for movement relatively to said main slide and in the same direction, means for detachably connecting said slides together, and a feed screw operatively connected to said auxiliary slide for moving the latter.

6. In an apparatus of the character described, the combination of a slide, a rack and pinion gear for giving said slide a rapid movement, and a screw feed mechanism for giving said slide a slow and accurately measured movement, said screw feed mechanism including a screw, an auxiliary slide engaged with said screw and means for connecting and disconnecting said auxiliary slide to and from the first named slide.

7. In an apparatus of the character described, the combination of a base, a cross slide on said base, a holder carried by said slide, a rack secured to the slide, a lever-operated pinion meshing with said rack for giving a rapid movement to said slide, and a screw disengageably connected with the slide for giving a slow movement to said slide.

8. In an apparatus of the character described, an indexing feed mechanism comprising a screw, an arm projecting radially from said screw, a gear wheel connected with the screw, a complemental changeable gear wheel meshing with the first named wheel and mounted with provision for longitudinal adjustment on said arm, the second named wheel being an index wheel and having an indexing stop shoulder and a stop pin mounted on said arm and adjustable longitudinally thereof for coöperation with index wheels of different sizes.

9. In an apparatus of the character described, an indexing feed mechanism comprising a screw, a gear wheel connected with said screw, a complemental changeable index wheel meshing with said gear wheel, and an index stop complemental with said index wheel, said stop being mounted with provision for adjustment toward and away from the screw, whereby to co-act with index wheels of different sizes.

10. A lathe attachment comprising a base adapted to be mounted on the bed of the lathe, a longitudinal slide mounted on said base, and an adjusting screw for said longitudinal slide, a cross feed slide mounted on the longitudinal slide, a post rising from said cross feed slide, a sleeve supported upon said post with provision for movement longitudinally thereon and also angularly about the same and a work holder secured to said sleeve with provision for adjustment thereon.

11. In a lathe attachment an upright post, a sleeve adjustable on said post and having a guide element transverse to the post, a work holding member engaged with said guideway in a manner to permit adjustment lengthwise thereof, and means for securing and adjusting said work holding member, comprising a screw having a bearing in the guideway, a bolt having a threaded eye engaged with said screw and passing through the work holding member and a nut upon said bolt arranged to confine a portion of said member between itself and the guideway.

12. A lathe attachment comprising a base or support adapted to be placed on the body of a lathe, a cross feed slide on said support, means for adjusting said slide transversely of the lathe bed, a column rising from said cross feed slide, a sleeve having a sliding fit on said column, a work holding member mounted on said sleeve, said member and the sleeve having complemental guiding means, arranged to permit adjustment of the work holding member transversely of the column, and complemental adjusting means connected with said sleeve and said work holding member for effecting such adjustments.

13. A lathe attachment comprising a longitudinal slide, a cross slide on said longitudinal slide, an upright on said cross slide, a member on said upright adjustable longitudinally thereon, an indexing feed mechanism for one of said slides, a micrometric feed mechanism for the other slide, and a micrometric adjusting mechanism for said member.

14. A lathe attachment comprising a base adapted to be mounted on the bed of a lathe, a slide on said base, an indexing feed mechanism also adapted to be mounted on the lathe bed and engaged with said slide, a cross slide, a micrometric feed mechanism engaged with both slides for feeding the cross slide, an upright on the cross slide, a member movable along said upright, and a micrometric adjusting mechanism for shifting said upright.

15. A lathe attachment comprising a base adapted to be mounted on the bed of a lathe, a slide on said base, an indexing feed mechanism also adapted to be mounted on the lathe bed and engaged with said slide, a cross slide, a micrometric feed mechanism engaged with both slides for feeding the cross slide, a cylindrically formed upright post on the cross slide, a sleeve surrounding the post and adjustable longitudinally upon and angularly about the same, a micrometric adjusting mechanism for shifting the sleeve along the post, and an index for measuring the angular movement of the sleeve around the post.

In testimony whereof I have affixed my signature, in presence of two witnesses.

HENRICK J. HJORTH.

Witnesses:
ARTHUR H. BROWN,
P. W. PEZZETTI.